(No Model.)
C. R. SMITH.
PROCESS OF MANUFACTURING SEAMLESS GOLD PLATED WIRE.
No. 449,183. Patented Mar. 31, 1891.
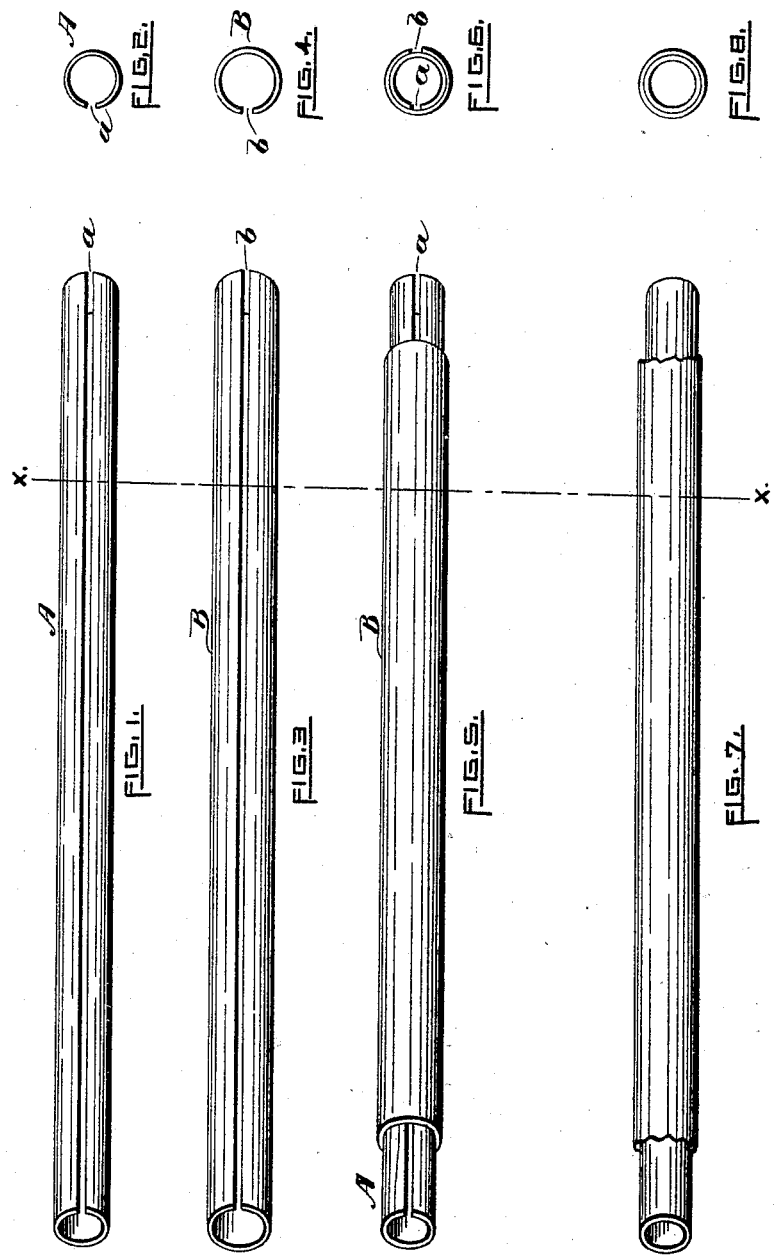
WITNESSES.
INVENTOR.
Charles R. Smith

United States Patent Office.

CHARLES R. SMITH, OF PROVIDENCE, RHODE ISLAND, ASSIGNOR TO THE C. R. SMITH PLATING COMPANY, OF KENTUCKY.

PROCESS OF MANUFACTURING SEAMLESS GOLD-PLATED WIRE.

SPECIFICATION forming part of Letters Patent No. 449,183, dated March 31, 1891.

Application filed July 24, 1890. Renewed February 18, 1891. Serial No. 381,974. (No specimens.)

*To all whom it may concern:*

Be it known that I, CHARLES R. SMITH, of the city and county of Providence, in the State of Rhode Island, have invented a certain new and useful Improvement in Processes of Manufacturing Seamless Gold-Plated Wire; and I declare the following to be a specification thereof, reference being had to the accompanying drawings.

Like letters indicate like parts.

Figure 1 is a perspective view of a split tube or shell of base metal. Fig. 2 is a cross-section of the same. Fig. 3 is a perspective view of a split tube or shell of gold stock. Fig. 4 is a cross-section of the same. Fig. 5 is a perspective view of the split tube of gold in position upon the split tube of base metal. Fig. 6 is a cross-section of the same. Fig. 7 is a perspective view of the seamless gold-plated hollow wire which is the product of my improved process. Fig. 8 is a cross-section of the same. All said cross-sections are on line $x\,x$.

My invention relates to that class of metallic tubes commercially known as "hollow wire" and adapted for the manufacture of various kinds of jewelry and for other uses.

It consists in forming a split tube of composition or base metal and another tube (either split or solid) of gold stock, placing the latter upon the former concentrically after having covered the former with a proper flux and passing them so in position through the flame of blow-pipes or otherwise suitably subjecting them to heat so as to melt the gold tube upon the composition tube, and giving this compound tube a smooth finish by drawing it through a draw-plate, as hereinafter more fully specified.

In the drawings, A represents a split tube or shell of composition or base metal, formed from sheet stock drawn through a draw-plate into a tubular form, having its edges nearly abutting each other and leaving an opening $a$ between them. A piece of flat gold stock is drawn up into a split tube or shell B in like manner, leaving a longitudinal opening $b$. It should be of a sufficient diameter to snugly receive the tube A. I then cover the tube A with a flux of borax and slip upon said tube the gold tube B. In Fig. 3 I show the gold tube B so in position upon the composition tube A. The openings $a\,b$ of these tubes, respectively, should not be coincident. I prefer to so place the tubes that the openings $a\,b$ are diametrically opposite each other. This compound tube A B should be fed with a longitudinal and rotary movement on between the flames of two or more blow-pipes by any suitable mechanism adapted for that purpose—as, for example, the machine shown in Letters Patent of the United States No. 428,056, granted to me and others, May 13, 1890, for an improvement in processes of manufacturing seamless gold-plated wire—or it may be manipulated by hand to properly present it to the flames, or it may be subjected to heat in a furnace in any suitable manner. The result of this exposure to the heat is that the gold tube B is melted in position upon the tube A and fused so that the opening $b$ is closed by the flowing together of its edges, and at the same time the opening $a$ of the tube A is filled by the melting of the gold tube B which covers it. When both these openings have been thus filled or fused together, I have a seamless tube whose exterior surface is gold and whose interior portion is a base metal. This tube is then drawn through a draw-plate in the usual manner to give it a smooth and polished surface and finish, and is then ready for use. It may be drawn down to any desired diameter in the usual manner of reducing hollow wire.

Instead of forming a split tube B of gold, as above described, I may use a solid tube of gold, formed by cupping up a flat piece of gold stock by dies and plungers and drawing out the same in the well-known manner. I do not confine myself to any specific method of forming the tubes A B, as the essential feature of my invention is fusing a gold tube of any sort upon a metallic tube of any sort to produce a seamless gold-plated hollow wire.

A small steel arbor may, if desired, be placed within the tube A during this process to give stiffness to the compound tubes while in operation; but, generally speaking, the tubes will have sufficient rigidity, as the interior space of the tube A will be of a comparatively less degree of temperature on account of the access of the air into it, and consequently will not be so much softened by the heat as to bend by its weight.

I claim as a novel and useful invention, and desire to secure by Letters Patent—

1. The improved process of manufacturing seamless gold-plated hollow wire herein described, consisting of the formation of a tube of base metal and a tube of gold stock, placing the latter upon the former to surround the same longitudinally with a fluxing material between them, subjecting the same so in position to heat sufficient to fuse the gold tube upon the base-metal tube, and finishing the compound tube so formed by drawing it through a draw-plate or in any known manner, substantially as specified.

2. The improved process of manufacturing seamless gold-plated hollow wire herein described, consisting of the formation of a longitudinally-split tube of base metal and a longitudinally-split tube of gold stock, covering the former with a fluxing material, slipping the gold tube upon the base-metal tube to cover the same, but so that the openings of said tubes shall not be coincident with each other, subjecting the compound tube to heat sufficient to fuse the gold tube upon the base-metal tube and at the same time to flow the melted gold into the openings of said tubes to close the same, and finishing the compound tube by drawing it through a draw-plate or in any known manner, substantially as specified.

CHARLES R. SMITH.

Witnesses:
DANIEL W. FINK,
WARREN R. PERCE.